Nov. 4, 1941.   H. J. LUEHRS   2,261,555
WEB REWINDING ROLL DRIVE
Filed June 14, 1940   2 Sheets-Sheet 1

INVENTOR
Hans J. Luehrs
BY
ATTORNEYS

Nov. 4, 1941.　　　　H. J. LUEHRS　　　　2,261,555
WEB REWINDING ROLL DRIVE
Filed June 14, 1940　　　2 Sheets-Sheet 2

INVENTOR
Hans J. Luehrs
BY
ATTORNEYS

Patented Nov. 4, 1941

2,261,555

UNITED STATES PATENT OFFICE 2,261,555

WEB REWINDING ROLL DRIVE

Hans J. Luehrs, Westerly, R. I., assignor to C. B. Cottrell & Sons Company, Westerly, R. I., a corporation of Delaware Application June 14, 1940, Serial No. 340,507

7 Claims. (Cl. 74—265)

The object of my invention is to provide novel means for rewinding in a roll, a web traveling at a uniform surface speed with sufficient tension on the traveling web to ensure a tightly wound roll even in large roll sizes.

My invention provides a web rewind roll drive which includes a differential gear friction clutch which is driven from a uniform speed drive and which drives the rewind roll, said clutch in the present instance comprising one gear member driven at a uniform speed and another gear member operatively connected to the rewind roll shaft and restrained by the web tension to drive the rewind roll shaft at a constantly lessening speed as the roll builds up at a uniform surface speed. The differential gear friction clutch may be of the single stage type or the multi-stage type, as desired.

My invention may also provide means for air cooling the gear members and friction discs of the clutch.

Practical embodiments of my invention are represented in the accompanying drawings, in which Fig. 1 represents a detail side view of the web rewind roll drive, certain portions of a single stage differential gear friction clutch being broken away to more clearly illustrate the parts beneath the same;

The uniform speed drive shaft 1 is shown as rotatably mounted in the side frame 2. The variable speed web rewind roll shaft 3 is also shown as rotatably mounted in the side frame 2. Between these two shafts 1 and 3, the axle of a differential gear friction clutch is shown as secured to the side frame 2.

Figure 1:
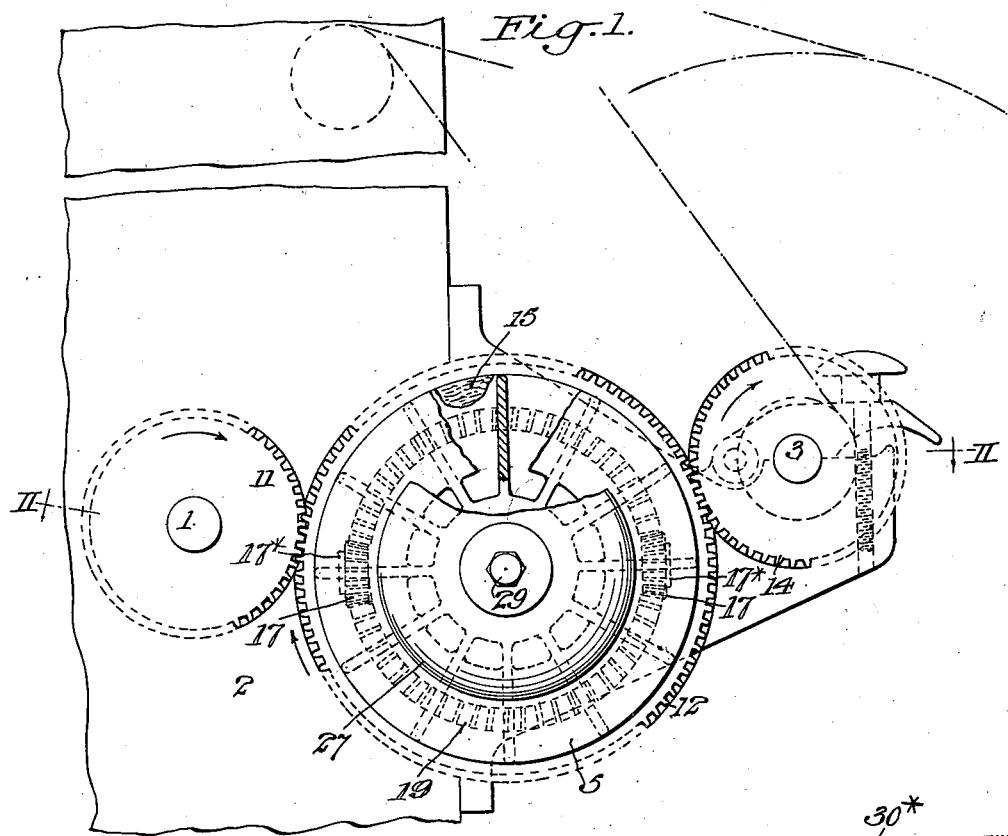
Figure 2:
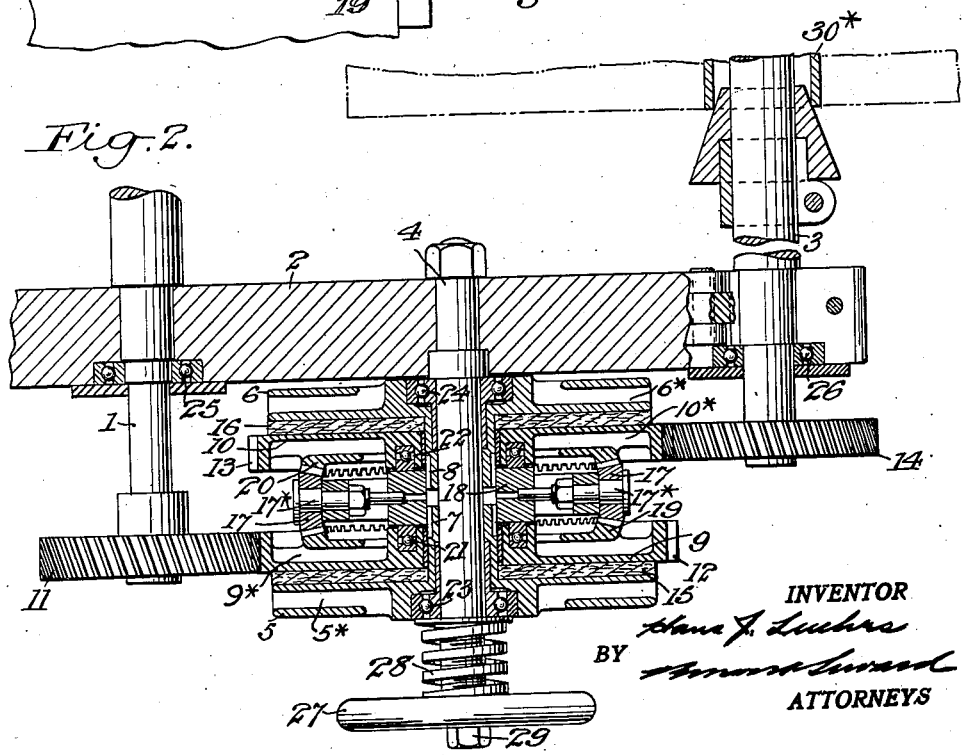
Fig. 2 represents a detail cross section taken in the planes of the line II—II of Fig. 1, looking in the direction of the arrows.

In the single stage type of clutch shown in Figs. 1 and 2 the axle is denoted by 4. The friction discs 5 and 6 of the clutch have their respective hubs 7 and 8 rotatably mounted on the said axle 4. The discs may be provided with suitable passages 5* and 6* respectively for air cooling the discs.

The hubs of the gear members 9 and 10 of the clutch are rotatably mounted on the hubs 7 and 8 respectively of the said friction discs 5 and 6. These gear members may be provided with suitable passages 9* and 10* respectively for air cooling the said gear members. The gear member 9 is shown as driven at a uniform speed from the driven shaft 1 through a spiral gear 11 on the drive shaft, which gear meshes with a spiral gear 12 on the gear member 9. The gear member 10 has a spiral gear 13 which meshes with a spiral gear 14 on the rewind roll shaft 3.

Friction washers 15 and 16 are inserted between the adjacent faces of the gear members 9 and 10 and their respective friction discs 5 and 6.

An equalizing bevel gear 17 is rotatably mounted on a radially disposed stud 17* carried by a frame 18, the hub of which is slidably interlocked with the hubs 7 and 8 of the friction discs 5 and 6 respectively. In the present instance two equalizing bevel gears 17 are shown. These bevel gears 17 mesh with bevel gears 19 and 20 on the gear members 9 and 10 respectively.

The spiral gears 11, 12 and 13, 14 serve to impart an endwise thrust to the gear members 9 and 10 in opposite directions, which thrust will react on the friction discs 5 and 6 proportional to the tooth pressure on said gears.

Anti-friction bearings 21 and 22 may be provided between the opposite sides of the hub of the frame 18 and the hubs of the gear members 9 and 10. Anti-friction bearings 23 and 24 may also be provided for mounting the friction discs 5 and 6 respectively. Anti-friction bearings 25 and 26 may also be provided for rotatably mounting the shafts 1 and 3.

The proper adjustment of the web tension may be provided for as follows: the axle 4 of the clutch is threaded at its outer end and the hub of a hand wheel 27 is screwed thereon, a coil spring 28 being inserted between the said hand wheel 27 and the anti-friction bearing 23 for the gear member 9. The tension of this spring 28 may be adjusted by turning the hand wheel 27 on the axle 4, a nut 29 being provided for locking the hand wheel 27 in its adjusted position.

The operation of the single stage differential gear shown in Figs. 1 and 2 is as follows: the uniform speed drive shaft 1 through the spiral gears 11 and 12 will drive the gear member 9 of the clutch at a uniform speed, which gear member 9, through the medium of the equalizing bevel gears 17, will drive the other gear member 10 of the clutch. This gear member 10, through the spiral gears 13 and 14, will drive the rewind roll shaft 3 at a constantly decreasing rotative speed due to the restraining tension of the web which is being rewound on its core 30* locked to said shaft. This difference in speed between the gear members 9 and 10 will increase in proportion to the increasing diameter of the web rewind roll.

Because of the use of the multi-disc friction differential gear clutch the speed of the discs 5 and 6 is halved, thereby providing a clutch of double capacity and permitting rolls of very large diameter to be successfully and tightly wound.

Furthermore, by making the gears 11, 12 and 13, 14 spiral gears, a thrust is created which will react on the friction discs only in proportion to the tooth pressure.

By providing the passages in the friction discs and in the clutch gear members it will be seen that these discs and members are air cooled and that thereby much of the heat engendered by their high speeds is rapidly and effectively removed.

Figure 3:
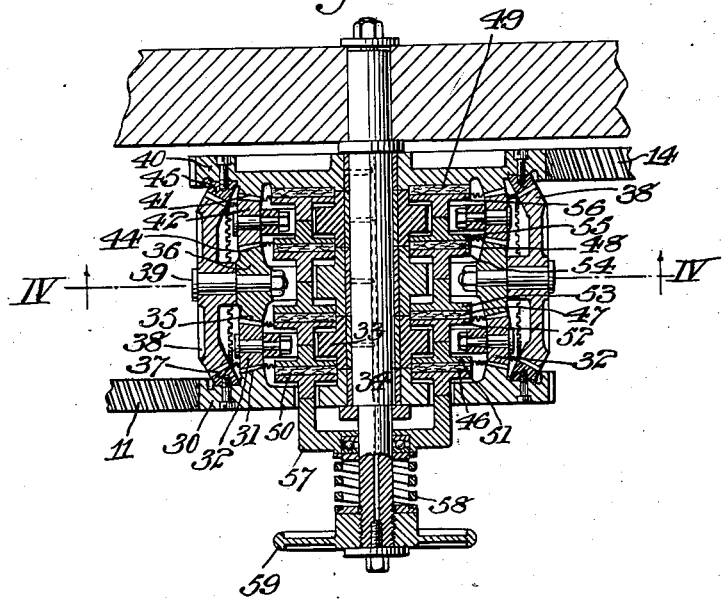
Fig. 3 represents a longitudinal central section taken through a multi-stage differential gear friction clutch adapted for use in my invention.
Figure 4:
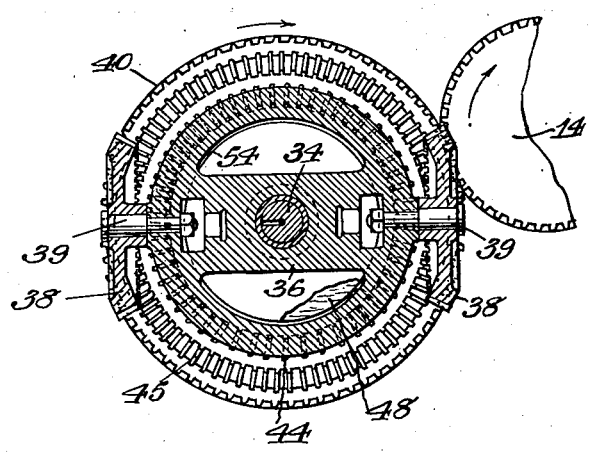
Fig. 4 represents a cross section taken in the plane of the line IV—IV of Fig. 3, looking in the direction of the arrows.

In the multi-stage type of clutch shown in Figs. 3 and 4 the gear member 30 is provided with an annular gear 31 which meshes with a small bevel gear 32 carried by an equalizing frame 33 rotatably mounted on the fixed axle 34, which bevel gear 32 also meshes with an annular bevel gear 35 on one face of an equalizing frame 36 rotatably mounted on the axle 34. This gear member 30 is also provided with an annular bevel gear 37 which meshes with a large bevel gear 38 pivoted on a stud 39 carried by the equalizing frame 36.

The other gear member 40 is provided with an annular bevel gear 41 which meshes with a small bevel gear 42 carried by an equalizing frame 43 rotatably mounted on the axle 34, which bevel gear 42 also meshes with an annular bevel gear 44 on the opposite face of the equalizing frame 36. This gear member 40 is also provided with an annular bevel gear 45 which meshes with the said large equalizing bevel gear 38. In the present instance there are shown a pair of bevel gears 32, a pair of bevel gears 38 and a pair of bevel gears 42 carried by their respective frames.

Friction washers 46, 47 and 48 are located between pairs of friction discs 50, 51; 52, 53; and 54, 55. The friction washer 49 is located between the friction disc 56 and the adjacent face of the gear member 40.

Spring pressure is exerted against the gear member 30 through the several discs by means of a yoke 57, a spring 58 being located between the yoke and the pressure adjusting hand wheel 59.

It will be understood that the operation of this multi-stage clutch is quite similar to that hereinbefore described with respect to the single stage clutch and therefore the description of the operation of this multi-stage clutch will be omitted.

It is evident that various changes may be resorted to in the construction, form and arrangement of the several parts without departing from the spirit and scope of my invention, and hence I do not intend to be limited to the particular embodiments herein shown and described, but what I claim is:

1. In a driving mechanism for a web tension controlled rewind roll shaft, a differential gear friction clutch comprising two gear members, their equalizing gear, and friction discs rotatable independently of and acting on their respective gear members, and a uniform speed drive for one gear member, the other gear member having a driving connection with the said rewind roll shaft.

2. In a driving mechanism for a web tension controlled rewind roll shaft, a differential gear friction clutch and its uniform speed drive shaft, said clutch comprising two gear members, their equalizing gear, friction discs rotatable independently of and acting on their respective gear members, and gears operatively connecting one gear member to the drive shaft and the other gear member to the rewind roll shaft.

3. In a driving mechanism for a web tension controlled rewind roll shaft, a differential gear friction clutch and its uniform speed drive shaft, said clutch comprising two gear members, their equalizing gear, friction discs rotatable independently of and acting on their respective gear members, and spiral gears operatively connecting one gear member to the drive shaft and the other gear member to the rewind roll shaft, said spiral gears serving to exert a thrust which will react on the friction discs in proportion to the tooth pressure on said gears.

4. In a driving mechanism for a web tension controlled rewind roll shaft, a differential gear friction clutch and its uniform speed drive shaft, said clutch comprising two gear members, their equalizing gear, friction discs acting on their respective gear members, and gears operatively connecting one gear member to the drive shaft and the other gear member to the rewind roll shaft, said friction discs and gear members having passages for air cooling the discs and gear members.

5. In a driving mechanism for a web tension controlled rewind roll shaft, a differential gear friction clutch and its uniform speed drive shaft, said clutch comprising two gear members, their equalizing gear, friction discs acting on their respective gear members, and spiral gears operatively connecting one gear member to the drive shaft and the other gear member to the rewind roll shaft, said spiral gears serving to exert a thrust which will react on the friction discs in proportion to the tooth pressure on said gears, said friction discs and gear members having passages for air cooling the discs and gear members.

6. In a driving mechanism for a web tension controlled rewind roll shaft, a differential gear friction clutch and its uniform speed drive shaft, said clutch comprising an axle, two friction discs having their hubs rotatable on said axle, two gear members rotatable on their respective disc hubs and acted upon by their respective friction discs, an equalizing gear having its frame slidably interlocked to said disc hubs, and gears operatively connecting said gear members to the drive and rewind roll shafts respectively.

7. In a driving mechanism for a web tension controlled rewind roll shaft, a differential gear friction clutch and its uniform speed drive shaft, said clutch comprising an axle, two friction discs having their hubs rotatable on said axle, two gear members rotatable on their respective disc hubs and acted upon by their respective friction discs, an equalizing gear having its frame slidably interlocked to said disc hubs, and spiral gears operatively connecting said gear members to the drive and rewind roll shafts respectively, said spiral gears serving to exert a thrust which will react on the friction discs in proportion to the tooth pressure on said gears.

HANS J. LUEHRS.